Figure 1:
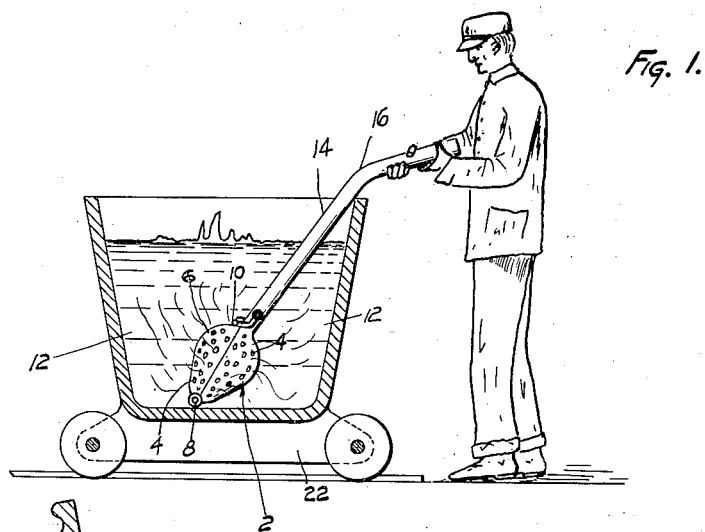

Feb. 27, 1934.  W. H. KELLY  1,949,051
TREATING METAL
Filed Aug. 19, 1929

Inventor
W. H. KELLY

By Fred D. Hayn
Attorney

Patented Feb. 27, 1934

1,949,051

UNITED STATES PATENT OFFICE 1,949,051

TREATING METAL

William H. Kelly, Los Angeles, Calif., assignor to Mary Elizabeth Kelly, Los Angeles, Calif.

Application August 19, 1929 Serial No. 386,762

13 Claims. (Cl. 75—17)

My invention relates to a process and apparatus for heating molten metals, such, for example, those forming a bearing metal of any preferred composition, suitable for all surfaces subject to friction; eliminating the impurities of the metals, and producing a product forming a perfect mechanical mixture having great heat conducting qualities.

It accordingly is an object of my invention to provide a novel form of process in which molten metals after they have been reduced are purified, eliminating the deleterious materials in a speedy, safe, inexpensive and efficacious manner, by separating the slag or causing said impurities to be converted into gases, said process comprising the introduction of a suitable water or other fluid retaining material within the molten metals, said material being confined in a suitable cage, such, for example, as a perforated casing of heat resisting material, whereby a gaseous envelop will initially be produced about said material, and thereafter nascent hydrogen and oxygen will issue from said perforations, causing the molten metals to be agitated, said nascent hydrogen thus commingling with said metals to purify the same.

It is also within the province of my invention to agitate the cage manually to insure that all the deleterious material may be entirely converted into slag or removed in the form of gases.

The above and further objects and advantages of my invention, as will hereinafter more fully appear, I attain by the process or method and the apparatus described in my specification and illustrated on the drawing, forming a part of my application.

Reference is had to the accompanying drawing, in which similar reference characters denote similar parts. In the drawing, Fig. 1 is a part sectional and part elevational view illustrating the manner in which my invention may be operated, Fig. 2 is a fragmentary, sectional view, on an enlarged scale, illustrating a suggestive form of cage, the full lines showing said cage open, and the dotted lines when said cage is closed, the section being taken on the line 2—2, Fig. 3, and Fig. 3 is an end view looking from the left, Fig. 2, as indicated by the arrow 3, the cage being closed.

Describing my invention more in detail, in its broader aspects said invention comprises a method or process for treating molten metals, such as those constituting, for example, bearing metals, whereby a perfect mechanical mixture of the metals constituting said bearing metal may result, said method or process comprising the introduction of a water or other fluid retaining material, such as a suitable refractory material, which may be asbestos or the like, said material being preferably saturated with any suitable fluid, gaseous or liquid, and preferably water, and confined in a suitable perforated cage, whereby, when said cage is introduced within the molten metals, an envelop of steam is initially formed about said material, thus effectively preventing any explosions and insuring the safety of the operator, after which said steam, due to the heat of the molten metals, is dissociated into nascent hydrogen and oxygen, which issue from the perforations in said cage, agitate said metals and commingle therewith, thus effectively disposing of the impurities therein in the form of slag or gases issuing from the molten metals at the surface thereof.

More specifically the means for carrying out my invention comprises a suitable cage 2, perforated as at 4, through which the nascent hydrogen and oxygen may issue when generated, a suitable closure 6, which may be hinged to the cage as at 8, a lock 10 of any preferred form being provided for locking said closure to said cage. The cage and its closure may be constructed of any suitable material such as will effectively resist the temperature of the molten metals 12, which material may in practice be varied.

Figure 2:
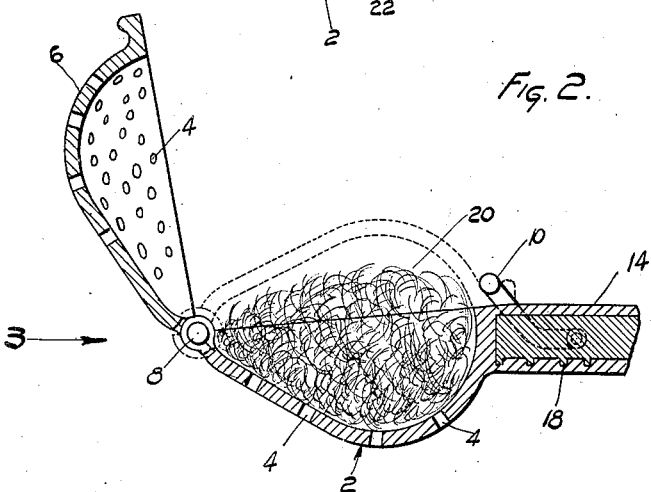
Figure 3:
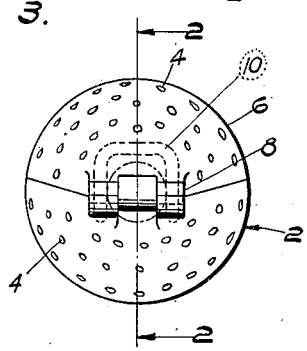

Associated with the cage 2 in any way in practice preferred, is the manipulating means or handle 14, which may be bent as at 16 to facilitate the manipulation thereof, said handle being preferably made of a material of poor heat conductivity, which handle, if desired, may be hollow, as shown in Fig. 2, and grooved as at 18 for the reception of a material of low heat conductivity or any cooling medium.

The cage 2 functions to receive the water or other fluid retaining material 20, which may be of any preferred refractory material, such as asbestos and the like, capable of absorbing a considerable amount of water.

In operation, the material 20, saturated with water, is placed in the cage 2, and the closure 6 locked. The molten metals 12, having been placed within the crucible on the wheeled truck 22, the cage 2 is introduced within said molten metals.

The intense heat of the molten metals causes the water in the fluid retaining material 20 to flash into steam, forming an envelop thereover, the structure of the cage effectively preventing any explosions, but causing agitation of the molten metals. The heat of said metals then causes the steam to dissociate into nascent hydrogen and oxygen at comparatively low pressures, said nascent hydrogen and oxygen then issuing from the perforations 4, and commingling with the molten metals, being brought into intimate contact therewith, and causing the impurities to be converted into gases which escape at the surface of said metals or be converted into slag, which may be removed from time to time. To insure that all the impurities are effectively removed, the operator may manipulate the cage 2 by the handle 14, to produce not only a self-imposed and automatic agitation, but also manually produced agitation of the molten metals.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. The process of treating molten metals which consists in introducing a perforated cage containing a saturated mass of water retaining material below the surface of said molten metals, whereby a film of steam will be formed about said material, the heat of said metals causing said steam to be disassociated into oxygen and hydrogen and to be released into said metals through said perforations.

2. Means for treating molten metals comprising a shell provided with perforations of substantial size, a mass of fluid retaining material in said shell, said material being saturated with a readily vaporizable fluid, whereby gases generated by the action of the heat of said molten metals on said material will cause said gases to issue from said perforations to commingle with said molten metals.

3. An article of manufacture for treating molten metals comprising a perforated shell constructed of refractory material, a perforated cover hinged to said shell, means for fastening said cover to said shell, a mass of refractory material in said shell adapted to be saturated with a readily vaporizable liquid, and a handle associated with said shell.

4. The process of treating molten metals, to remove the impurities thereof, without danger to the operator, due to explosion or the formation of noxious gases, which consists in introducing a mass of water saturated material, enclosed in a perforated casing, below the surface of said metals, whereby a confined gaseous mixture will be generated about said material, and causing said mixture to be substantially freely removed from its confinement to commingle with said metals to cause an automatic agitation and to unite with the impurities in said metals, whereby said metals will be purified without mechanical agitation.

5. The process of treating molten metals which consists in subjecting a mass of material, enclosed in a perforated casing, and saturated with water, to the heat of said metals, by plunging said casing and material therein, then causing said fluid to be disassociated to form a gaseous mixture in the neighborhood of said material, and then causing the elements of said mixture to commingle with said molten metals to unite with the impurities thereof to purify the same.

6. Means for treating molten metals comprising a shell provided with perforations of substantial size, and a mass of fluid retaining material in said shell, said material being saturated with water, whereby the elements of which said water is comprised will be disassociated either within said shell, and pass through said perforations, or without said shell by the action of the heat of said molten metals.

7. The process of refining molten metals which consists in introducing a perforated shell containing a refractory water absorbing material, in which water has been absorbed below the surface of said metals, whereby the fluid formed by the heat of said metals and issuing from said perforations will unite with the impurities of said metals.

8. The process of refining molten metals which consists in introducing a mass of water saturated, loosely associated refractory material below the surface of said molten metals, whereby the heat of said metals will cause the fluid formed from said saturated material to purify said metals by uniting with the impurities thereof.

9. In a device for use in connection with molten metals, whereby said metals may be purified, said device comprising a two-part perforated shell, means for hinging the parts of said shell together, a handle associated with said shell for manipulating said shell, a mass of loosely associated refractory material having a substantial wetting surface in said shell, and substantially filling said shell and means for holding the parts of said shell in closed position.

10. In a device of the class described, a plural part perforated shell, means for hinging the parts of said shell together, a mass of asbestos substantially filling said shell, means for holding the parts of said shell in closed position, and a handle for manipulating said shell.

11. In a device of the class described, a hollow two-part perforation shell of oval form, one end of which is enlarged, and tapered toward the other end, a handle on said one end, a hinge on said other end, a mass of wetted asbestos substantially filling said shell, and means associated with said one end for securing said parts together.

12. The process of treating molten metals, to remove their impurities, which consists in introducing a mass of refractory material confined in a perforated casing and saturated with water below the surfaces of said metals, causing said fluid to be converted into a gaseous swirling mixture, and causing said mixture to be substantially freely removed from the confinement to commingle with the molten metals to cause automatic agitation thereof.

13. The process of treating molten metals, without explosion or the formation of noxious gases, which consists in positioning a mass of refractory materials, enclosed in a perforated casing and saturated with water, below the surfaces of said metals, causing said fluid by the heat of said metals, to form a vapor pressure about said material, and then causing said vapor pressure to be communicated from its enclosure to said metals, to cause an automatic agitation thereof.

WILLIAM H. KELLY.